United States Patent [19]
Allison et al.

[11] Patent Number: 5,687,895
[45] Date of Patent: Nov. 18, 1997

[54] INTERLOCKING ARRANGEMENT OF STORAGE BOXES FOR A SPORT UTILITY VEHICLE

[75] Inventors: Gregory P. Allison, Keego Harbor, Mich.; Dallas L. Vernon, Louisville, Colo.

[73] Assignee: Bestop, Inc., Broomfield, Colo.

[21] Appl. No.: 546,500

[22] Filed: Oct. 20, 1995

[51] Int. Cl.$^6$ .............................. B60R 9/055; B60R 11/00
[52] U.S. Cl. ..................... 224/542; 224/404; 224/539; 224/275; 220/23.4; 296/37.1; 296/37.6
[58] Field of Search ...................... 224/404, 541, 224/542, 543, 539, 275; 220/23.4, 23.86; 296/37.16, 37.6, 37.1, 37.8, 64

[56] References Cited

U.S. PATENT DOCUMENTS

| | | | |
|---|---|---|---|
| D. 321,159 | 10/1991 | Schlachter | D12/156 |
| 2,784,027 | 3/1957 | Temp | 224/404 |
| 3,567,274 | 3/1971 | Kaptur, Jr. et al. | 296/50 |
| 4,733,898 | 3/1988 | Williams | 224/404 |
| 4,789,195 | 12/1988 | Fletcher | 224/543 |
| 4,911,493 | 3/1990 | Muirhead | 296/37.6 |
| 4,938,519 | 7/1990 | Schlachter | 296/37.6 |
| 5,324,089 | 6/1994 | Schlachter | 296/37.5 |

*Primary Examiner*—Linda J. Sholl
*Attorney, Agent, or Firm*—W. Scott Carson

[57] ABSTRACT

An interlocking arrangement of storage boxes in the rear section of a passenger vehicle such as a sport utility vehicle. The arrangement preferably includes at least three storage boxes. Two of the boxes are respectively secured to the side walls of the vehicle. These side boxes are spaced from each other and the third box is slidably receivable between them. In the preferred embodiment, the third box has lips on its sides that respectively interlock with lips on the two side boxes to prevent the third box from being removed by lifting it upwardly between the two side boxes. Forward stops on the side boxes prevent the third box from being moved forwardly beyond the side boxes and the vehicle's tailgate in its closed position serves to prevent the third box from being moved rearwardly out of the vehicle. In this manner and with the tailgate in its locked, closed position, the three interlocking storage boxes are securely held in place.

44 Claims, 3 Drawing Sheets

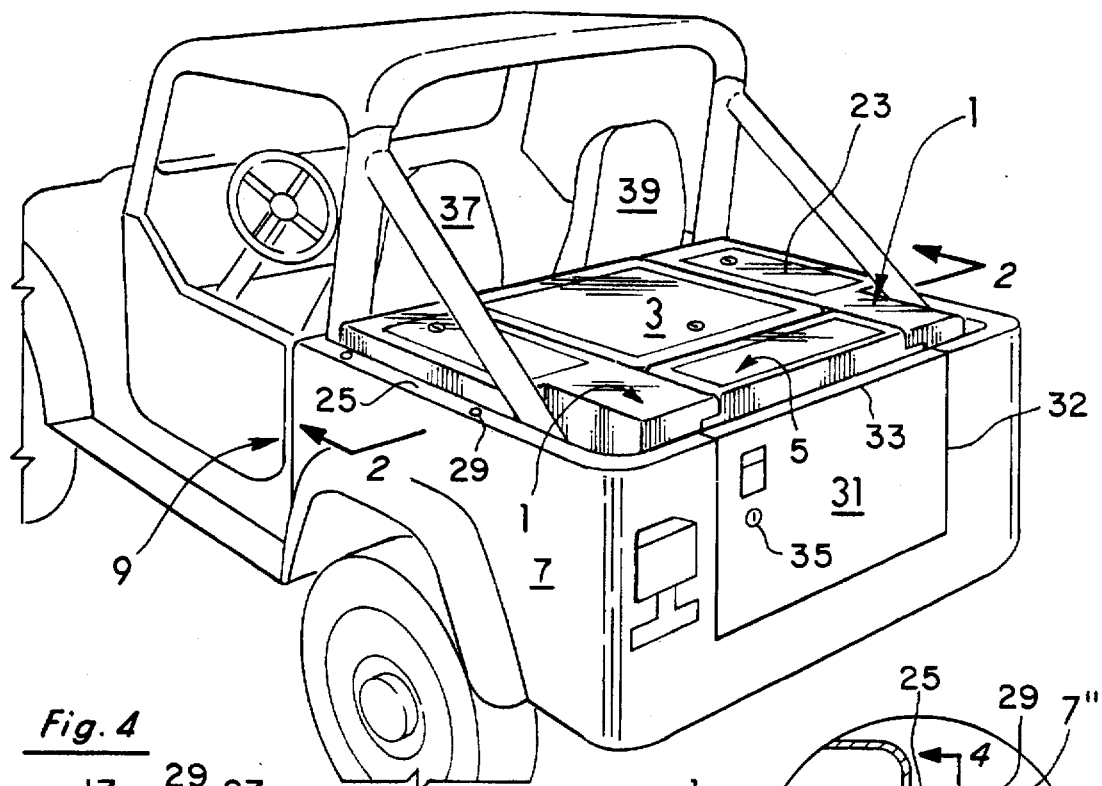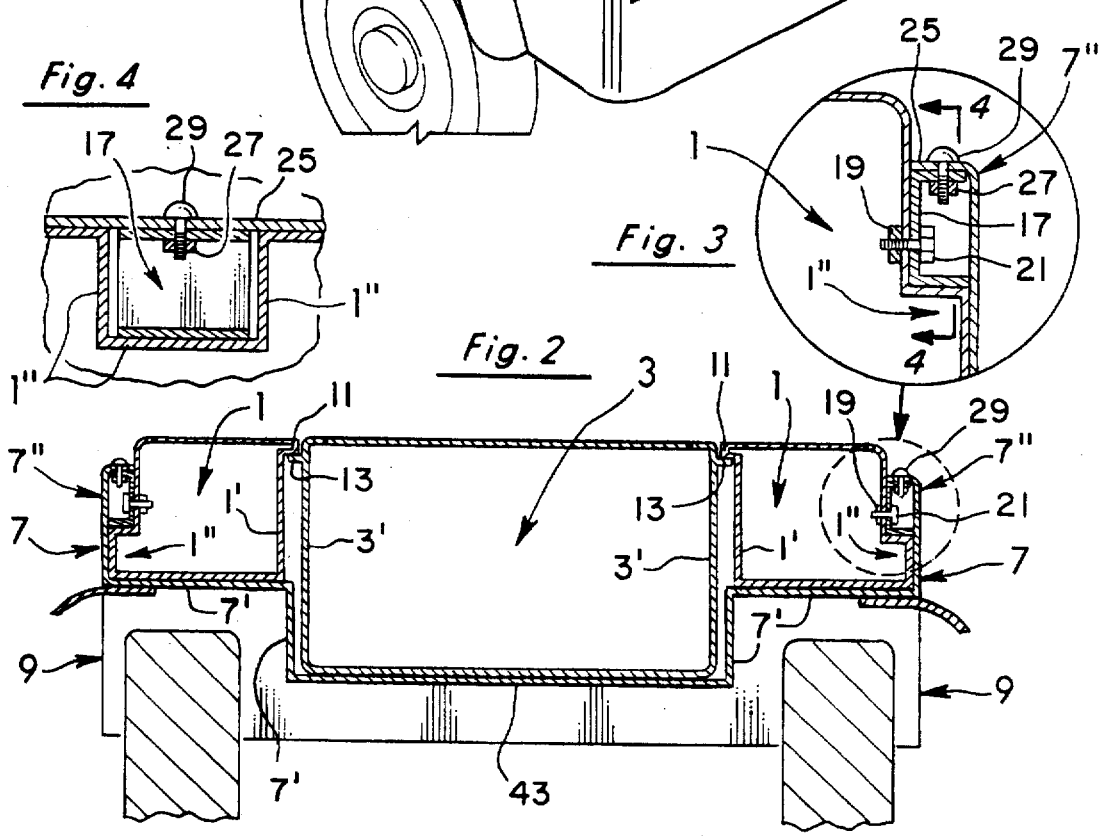

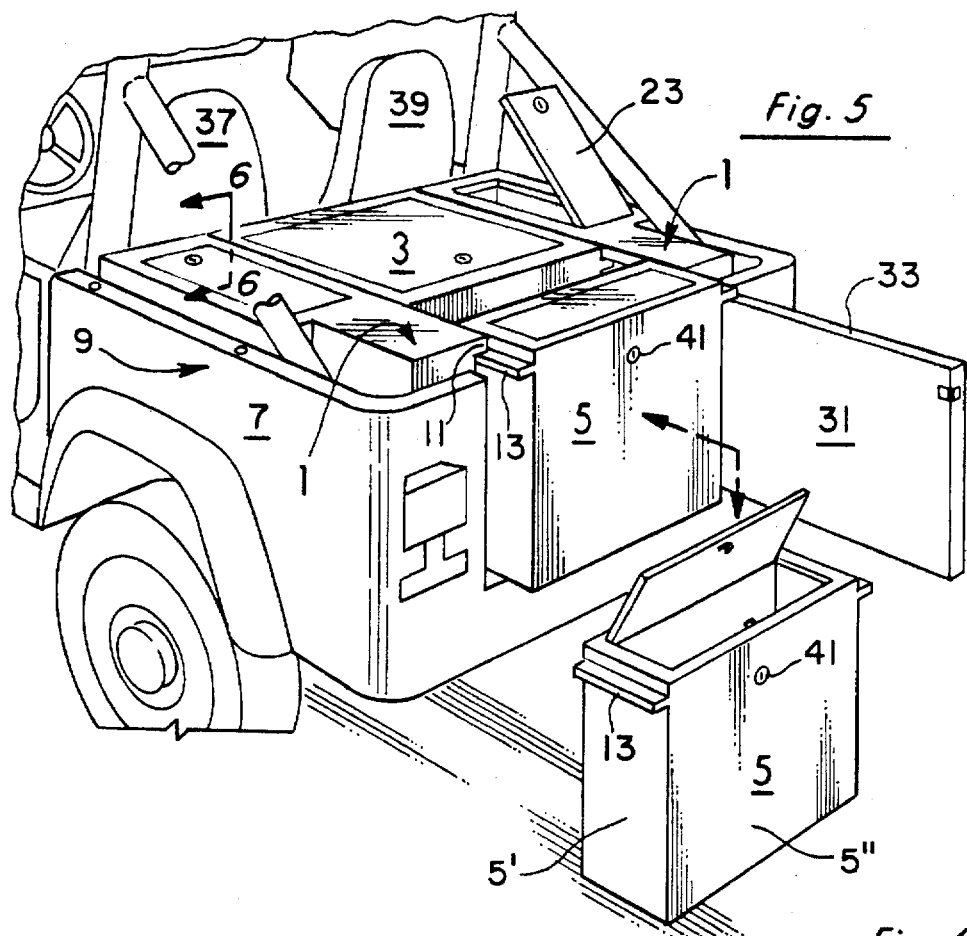
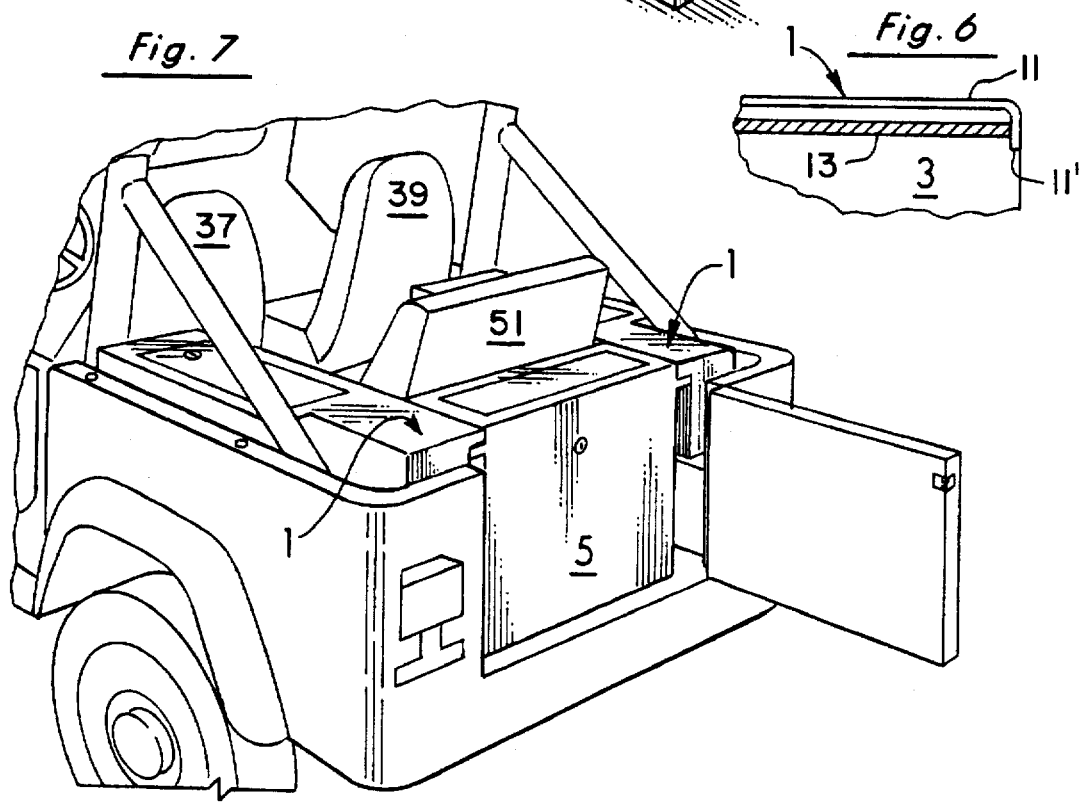

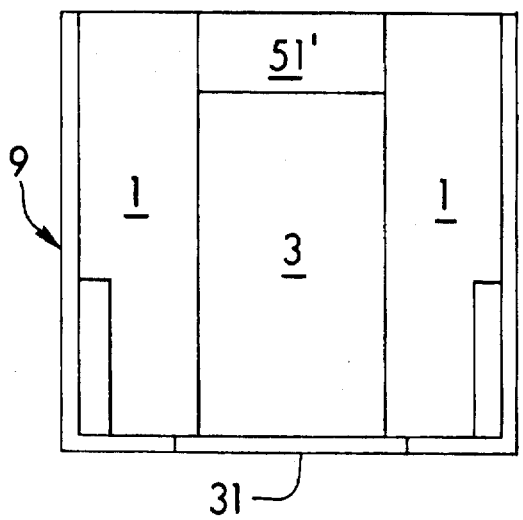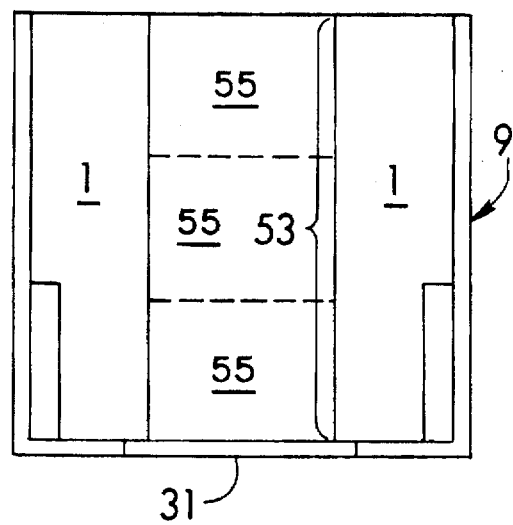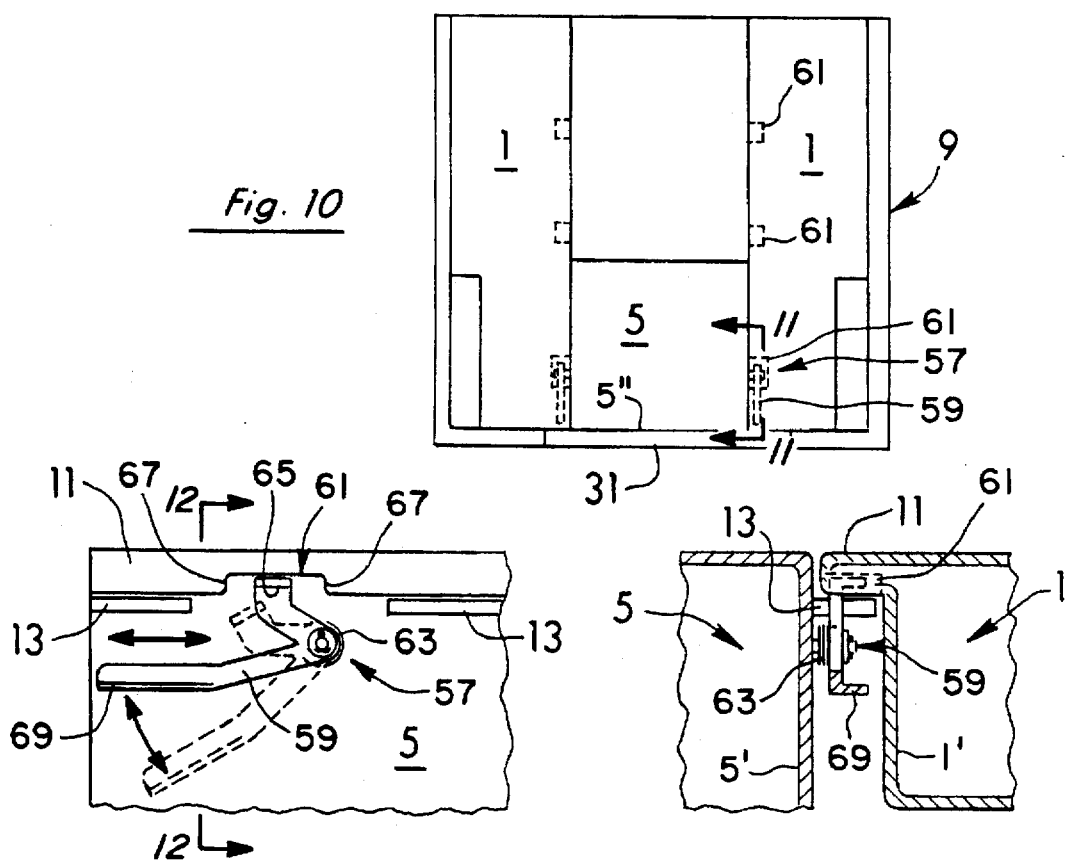

INTERLOCKING ARRANGEMENT OF STORAGE BOXES FOR A SPORT UTILITY VEHICLE

BACKGROUND OF THE INVENTION

1. Field of the Invention

This invention relates to the field of storage arrangements for passenger vehicles and more particularly to the field of such arrangements in the rear section of sport utility vehicles.

2. Discussion of the Background

Storage space in the rear of many passenger vehicles including sport utility ones is often very limited. Additionally, such vehicles popularly have removable hardtops or soft tops. With these tops removed, security can be a problem for any items in the rear of the vehicle as they can be easily reached and removed. Further, even such vehicles with their soft tops on them can present security risks as the fabric of the soft top is really not intended to stop thieves intent on cutting the fabric to reach the vehicle's interior.

In this light, the present invention was developed. With it, a compact arrangement of interlocking storage boxes is provided which can be secured even in an uncovered vehicle.

SUMMARY OF THE INVENTION

This invention relates to an interlocking arrangement of storage boxes in the rear section of a passenger vehicle such as a sport utility vehicle. The arrangement preferably includes at least three storage boxes. Two of the boxes are respectively secured to the side walls of the vehicle. These side boxes are spaced from each other and the third box is slidably receivable between them. In the preferred embodiment, the third box has lips on its sides that respectively interlock with lips on the two side boxes to prevent the third box from being removed by lifting it upwardly between the two side boxes. Forward stops on the side boxes prevent the third box from being moved forwardly beyond the side boxes and the vehicle's tailgate in its closed position serves to prevent the third box from being moved rearwardly out of the vehicle. In this manner and with the tailgate in its locked, closed position, the three interlocking storage boxes are securely held in place. To remove the third box, the tailgate must be unlocked and opened using the vehicle's key. The third box can then be easily and quickly slid rearwardly past the side boxes and completely removed from the vehicle if desired.

BRIEF DESCRIPTION OF THE DRAWINGS

FIG. 1 is a perspective view of a sport utility vehicle with the interlocking arrangement of storage boxes of the present invention secured in place in the rear of the vehicle.

FIG. 2 is a view taken along line 2—2 of FIG. 1.

FIG. 3 is an enlarged view of the manner in which each of the side storage boxes of FIG. 2 is secured to one of the side walls of the vehicle.

FIG. 4 is a view taken along line 4—4 of FIG. 3.

FIG. 5 is a perspective view similar to FIG. 1 but showing the tailgate of the vehicle opened to permit the removal of the central storage boxes.

FIG. 6 is a view taken along line 6—6 of FIG. 5 illustrating how each side storage box has a depending forward lip to prevent the central boxes from moving forwardly beyond the side boxes.

FIG. 7 is a perspective view similar to FIG. 5 but with one of the central storage boxes of FIG. 5 removed and replaced by a rear passenger seat.

FIGS. 8 and 9 are schematic illustrations of some of the possible combinations of storage boxes that can be used in the present invention. In FIG. 8, the rear passenger seat of FIG. 6 has been folded forwardly and the small central box replaced with a larger one. In FIG. 9, a configuration is shown in which the two central boxes of FIG. 1 have been replaced by a single, large box. The dotted lines in FIG. 9 illustrate how the single, large box shown in solid lines could be replaced by three, smaller ones if desired.

FIG. 10 is a schematic illustration of another configuration in which a small, central box is the only one positioned between the side boxes.

FIG. 11 is a view taken along line 11—11 of FIG. 10 showing a spring biased latch and recess arrangement operable to hold the central box in a predetermined position adjacent the tailgate.

FIG. 12 is a view taken along line 12—12 of FIG. 11 illustrating further details of the latch and recess arrangement.

DETAILED DESCRIPTION OF THE PREFERRED EMBODIMENTS

As best seen in FIG. 1, one configuration of the interlocking storage boxes of the present invention includes two side boxes 1 and two central boxes 3 and 5. Each side storage box 1 in this configuration is preferably a mirror image of the other and respectively secured to a side wall 7 of the vehicle 9 (see FIG. 2). The central boxes 3 and 5 are then each slidably received between the secured side boxes 1 with the respective lips 11 and 13 vertically overlapping and interlocking.

More specifically and as shown in FIGS. 2 and 3, each side storage box 1 is preferably positioned above a respective wheel well 7' of the vehicle side wall 7. Each side box 1 is also preferably secured to the upper portion 7" of the respective vehicle wall 7. This can be done in any number of manners. However, it preferably includes structure like the bracket 17 and nut-bolt arrangement 19, 21 of FIG. 3 wherein to undo the side box 1, access must be obtained to the interior of the box 1 by opening the lockable lid 23 (see FIG. 1). In this regard, the upper portion 7" of the vehicle side wall 7 as illustrated in the enlarged view of FIG. 3 normally has an inwardly projecting lip or ledge 25. The bracket 17 is then first secured by nut 27 and carriage bolt 29 to the lip 25. The carriage bolt 29 has a smooth head and cannot be turned from the outside. With the side box 1 positioned adjacent the bracket 17, the nut 19 and bolt 21 are then secured in place. This is done by opening the lockable lid 23 of box 1 (FIG. 5), reaching into the hollow interior of the box 1 (see FIG. 3 again), and tightening the nut 19 on the bolt 21. As stated above, other securing methods could be used but like the one of FIGS. 2 and 3, they preferably would require access through the lockable lid 23 of the box 1 to be undone. It is also preferred that the securing arrangement not involve piercing the exterior of the vehicle side wall 7 or welding the box 1 to the wall 7 but these could be done if desired.

Referring again to FIGS. 2 and 3 and with each side box 1 secured in place adjacent the upper portion 7" of each vehicle side wall 7, the central boxes 3 and 5 can then be slid therebetween. Each central box 3 and 5 in this regard is completely removable from the vehicle 9. Consequently, with the rear tailgate 31 moved to its open position of FIG.

5, the central box 3 and thereafter the central box 5 can be manually moved from a remote position outside of the vehicle 9 to an interior position in the storage area in the rear section of the vehicle 9. This is done as illustrated in FIG. 5 in reference to the central box 5 by simply lifting up the box 5, aligning the overlapping lips 11 and 13 which extend substantially horizontally along the sides of the boxes 1 and 5, and sliding the box 5 forwardly of the tailgate opening. The pivotally mounted tailgate 31 (FIG. 5) can then be pivoted about the vertical axis 32 to its closed position of FIG. 1.

In the position of FIG. 1 and with the tailgate 31 closed and secured by its normal tailgate lock 35, the central boxes 3 and 5 are prevented from being slid rearwardly past the closed tailgate 31. Additionally, the boxes 3 and 5 are prevented from being lifted upwardly past the side boxes 1 by the vertically overlapping lips 11 and 13 (FIG. 2). Further, the boxes 3 and 5 are prevented or stopped from being moved forwardly beyond engagement with the side boxes 1 by the downwardly projecting lip or stop 11' (see FIG. 6) against which the lip 13 of the central box 3 abuts. Alternatively, the central boxes 3 and 5 can be prevented from being moved forwardly beyond the side boxes 1 merely by the driver and front passenger seats 37 and 39.

With this simple, interlocking arrangement of storage boxes 1, 3, and 5 in cooperation with the closed and locked tailgate 31, boxes 1, 3, and 5 are securely held and locked in place. Further, the central boxes 3 and 5 cannot be removed unless the person has the key to the lock 35 of the tailgate 31. In most cases, this conventional tailgate lock 35 is quite substantial and cannot easily be opened without the owner's key. Further, even if an unauthorized person were to force open the lids 23 of the side boxes 1 and unscrew the nuts 19 from the bolts 21, the configuration of the boxes 1, 3, and 5 is preferably such that they still cannot be removed without unlocking and opening the tailgate 31. More specifically, each box 1 as shown in FIGS. 2 and 3 includes a dog-leg portion 1" that fits snugly under the bracket 17 and/or under the vehicle wall lip 25 on either side of the bracket 17 (see FIG. 4). Additionally, the side 1' of the box 1 (see FIG. 2) fits closely adjacent the side 3' of the central box 3. Consequently, even with the nut 19 and bolt 21 removed, it is not possible to lift or twist the boxes 1 to remove them from their positions of FIG. 2 adjacent the vehicle side walls 7. Rather, as was the case before, it would still be necessary to have the key to the tailgate lock 35 in order to remove any or all of the boxes 1, 3, and 5. For additional security in this regard, the bolt 21 could be welded or otherwise made integral with the bracket 17 wherein it could not be removed from its position of FIGS. 2 and 3 even if the nut 19 were removed.

It is also noted at this time that the boxes 1 and 3 have lids (see FIG. 1) that are lockable and can be opened upwardly about horizontal axes in the fashion of lid 23 illustrated in FIG. 5. In this manner, the boxes 1 and 3 can be opened by the owner even in the secured position of FIG. 1. However, in the preferred embodiment, box 5 is a security box for the owner's most valuable items and has its lock 41 (see FIG. 5) on the front side 5" of box 5 below the top 33 of the tailgate 31. Consequently, in the closed position of FIG. 1, the lock 41 on the front side 5" of the security box 5 faces and substantially abuts the closed tailgate 31. This prevents any access to the lock 41 at all when the tailgate 31 is closed in the configuration of FIG. 1. Alternately, the security box 5 could be placed if desired with the side 5" with the lock 41 facing and substantially abutting the other central box 3 in FIG. 1. However, the illustrated positioning of FIGS. 1 and 5 is preferred as access by the owner to the lock 41 is then easily and quickly available by simply unlocking and opening the tailgate 31.

The central storage boxes 3 and 5 in the interior positions of FIGS. 1 and 2 preferably rest on the vehicle floor 43 that extends substantially between the vehicle side walls 7. The floor 43 and side walls 7 (as they extend downwardly from 7" over the wheels at 7') then define a storage area forward of the closed tailgate 31. This storage area extends forwardly substantially to the driver and front passenger seats 37 and 39. With the side boxes 1 secured to or adjacent the respective vehicle side wall 7, the central boxes 3 and 5 are then positioned above the floor 43 between the boxes 1 (FIG. 2) and locked in place by the overlapping lips 11 and 13, the downwardly projecting lip portion 11' of FIG. 6, and the closed tailgate 31 of FIG. 1. The interlocking lips 11 and 13 as mentioned above engage to prevent vertical lifting of the boxes 3 and 5 past the side boxes 1, the depending lip portion 11' prevents forward movement of the boxes 3 and 5 beyond the engagement of lips 11, 13 with boxes 1, and the closed tailgate 31 prevents rearward movement of the central boxes 3 and 5 beyond the engagement of lips 11, 13 with the side boxes 1.

FIGS. 7–10 illustrate other configurations of the invention. In FIG. 7, the larger, storage box 3 of FIG. 1 is removed and replaced by a rear passenger seat 51. The rear seat 51 is positionable between the side boxes 1 wherein the side boxes 1 additionally can serve as arm rests or consoles. The passenger seat 51 in this configuration is forward of the box 5 and serves to prevent the box 5 from moving forwardly past engagement with the side boxes 1. The rear seat 51 is foldable in a known manner (e.g., to an inverted V-shape) to assume the smaller, compact shape schematically shown at 51' in FIG. 8. The smaller, security box 5 of FIG. 7 can then be replaced with the larger, cargo box 3. Similarly, as schematically shown in FIG. 9, the rear seat 51 and both boxes 3 and 5 can be removed and replaced with a single, large box 53 (shown in solid lines) or three smaller boxes 55 (shown in dotted lines). Alternatively, the entire space between the side boxes 1 can be left empty or only partially filled, as for example, by a single box 5 as illustrated in FIG. 10. In this regard, each side box 1 preferably extends from front to rear a distance greater than box 5 so box 5 could be positioned anywhere along the space between boxes 1.

Additionally, each side box 1 is preferably just one box but could be two or more if desired.

The embodiment of FIG. 10 preferably includes a latch and recess arrangement at 57 to selectively secure the box 5 at one of a plurality of predetermined positions between and along the side boxes 1. Preferably, the plurality of positions includes the one shown in FIG. 10 wherein the tailgate 31 substantially abuts the rear facing side 5" to prevent access to the lock 41 on the side 5" as discussed above. This positioning could be accomplished in a number of manners including the latch 59 and recess 61 of FIGS. 11 and 12. In the illustrated arrangement 57, the latch 59 is pivotally mounted on the side 5' of box 5 and biased by coil spring 63 toward the locking or securing position shown in solid lines in FIG. 11. In this position, the detent portion 65 of the latch 59 is received in the recess 61 in the lip 11 of side box 1 and the box 5 cannot be slid rearwardly or forwardly beyond the recess walls 67. To release the box 5 from the position of FIG. 10, the owner must first unlock and open the tailgate 31 and then reach between the sides 1' and 5' of boxes 1 and 5 (see FIGS. 11 and 12) to depress the rearwardly extending, lever portion 69 of the latch 59. Once depressed as shown in dotted lines in FIG. 11, the detent portion 65 will clear the recess walls 67 and the box 5 can be slid rearwardly out of the vehicle 9. In this embodiment and with the tailgate 31 in its closed and locked position of FIG. 10, access to the release lever portion 69 for all practical purposes is prevented and the box 5 can only be opened and/or removed by someone with the owner's key to the tailgate lock 35. As mentioned above, other arrangements to so selectively secure the box 5 of FIG. 10 anywhere along the space between boxes 1 could be used if desired.

While several embodiments of the present invention have been shown and described in detail, it is to be understood that various changes and modifications could be made without departing from the scope of the invention.

We claim:

1. An interlocking arrangement for storage boxes, said interlocking arrangement including a passenger vehicle having a rear tailgate mounted for movement between open and closed positions and further having a rear section with first and second side walls spaced from each other with a floor extending substantially therebetween to define a central storage area forward of said tailgate when said tailgate is in said closed position, said storage area being upwardly open from said floor to expose said floor from above and to provide a passenger of said vehicle with access from above to said storage area and to said exposed floor, said interlocking arrangement for said storage boxes further including at least first, second, and third distinct storage boxes, means for securing said first storage box to the first side wall of said vehicle and means for securing said second storage box to the second side wall of the vehicle in a position spaced from the first storage box across said floor, said third storage box being manually movable between a remote position removed from the vehicle and in interior position in said upwardly open storage area above the floor inside the rear section of the vehicle between said first and second storage boxes, said third storage box having a top exposed from above and accessible from above to said passenger of said vehicle when said third storage box is in said interior position, said interlocking arrangement further including locking means for selectively locking said third storage box in said interior position in said storage area above the floor between said first and second storage boxes, said locking means including means for slidably receiving said third storage box in said interior position between said first and second storage boxes, said slidably receiving means including means on said third storage box for respectively engaging said first and second storage boxes to prevent movement of said third storage box from said interior position upwardly between said first and second storage boxes while still providing said passenger with access to the exposed top of said third storage box, said locking means further including means for preventing said third storage box from being moved forwardly beyond said engagement with said first and second storage boxes and means for selectively preventing said third storage box from being moved rearwardly beyond said engagement with said first and second storage boxes, said means for selectively preventing said third storage box from being moved rearwardly beyond said engagement with said first and second storage boxes including said tailgate wherein said third storage box is prevented by said tailgate in said closed position from being moved rearwardly beyond said engagement with said first and second storage boxes and wherein said third storage box can be moved beyond said engagement with said first and second storage boxes to said remote position removed from said vehicle when said tailgate is in said open position.

2. The interlocking arrangement of claim 1 wherein said vehicle includes means for mounting said tailgate for pivotal movement between said open and closed positions.

3. The interlocking arrangement of claim 2 wherein said tailgate mounting means mounts said tailgate for pivotal movement about a vertical axis between said open and closed positions.

4. The interlocking arrangement of claim 1 wherein said vehicle includes means for selectively locking said tailgate in said closed position.

5. The interlocking arrangement of claim 1 wherein each of said storage boxes has a hollow interior and includes an openable lid and means for selectively locking said lid to prevent access to said interior.

6. The interlocking arrangement of claim 1 wherein said removable third storage box has a hollow interior and includes an openable lid and means for selectively locking said lid to prevent access to said interior.

7. The interlocking arrangement of claim 6 wherein said lid locking means for said third storage box faces and substantially abuts said tailgate when said tailgate is in said closed position to thereby prevent access to said lid locking means when said tailgate is in said closed position.

8. The interlocking arrangement of claim 1 wherein said first and third storage boxes have respective sides and said means for preventing said third storage box from being moved from said interior position upwardly between said first and second storage boxes includes portions of said sides substantially abutting one another when said third storage box is in said interior position.

9. The interlocking arrangement of claim 8 wherein said abutting side portions have interlocking members.

10. The interlocking arrangement of claim 9 wherein said interlocking members are overlapping lips.

11. The interlocking arrangement of claim 10 wherein said lips vertically overlap one another.

12. The interlocking arrangement of claim 10 wherein said lips respectively extend substantially horizontally along said first and third storage boxes.

13. The interlocking arrangement of claim 1 wherein said first and second storage boxes are substantially mirror images of each other.

14. The interlocking arrangement of claim 1 further including a rear passenger seat positionable between said first and second storage boxes.

15. The interlocking arrangement of claim 14 wherein said passenger seat is positioned forwardly of said third storage box.

16. The interlocking arrangement of claim 15 wherein said means for preventing said third storage box from being moved forwardly beyond said first and second storage boxes includes said passenger seat.

17. The interlocking arrangement of claim 15 wherein said passenger seat is foldable.

18. The interlocking arrangement of claim 17 wherein said means for preventing said third storage box from being moved forwardly beyond said first and second storage boxes includes said folded passenger seat.

19. The interlocking arrangement of claim 1 wherein said means for preventing said third storage box from being moved forwardly beyond said first and second storage boxes includes stop means on said first storage box.

20. The interlocking arrangement of claim 19 wherein said stop means includes a downwardly projecting lip.

21. The interlocking arrangement of claim 1 further including at least a fourth storage and means for selectively locking said fourth storage box in an interior position inside the rear section of said vehicle forwardly of said third storage box and between said first and second storage boxes.

22. The interlocking arrangement of claim 21 wherein said fourth storage box can be manually moved between a remote position removed from said vehicle and said interior position and said locking means for said fourth storage box includes means for slidably receiving said fourth storage box in said interior position, said slidably receiving means including means on said fourth storage box for respectively engaging said first and second storage boxes to prevent movement of said fourth storage box upwardly from said interior position between said first and second storage boxes.

23. The interlocking arrangement of claim 1 wherein said first, second, and third storage boxes have respective fronts and rears with the fronts and rears of said first and second storage boxes being spaced from each other respective distances greater than the spacing between the front and rear of said third storage box wherein said third storage box can be slidably placed at a plurality of positions between and along said first and second storage boxes forward of said tailgate in said closed position and said locking means further includes means for selectively securing said third storage box to at least one of said first and second storage boxes at a predetermined one of said plurality of positions.

24. The interlocking arrangement of claim 1 wherein said locking means further includes means for selectively securing said third storage box at a predetermined one of a plurality of positions between said first and second storage boxes.

25. The interlocking arrangement of claim 24 wherein said securing means includes a latch and recess arrangement selectively operable between said third storage box and at least one of said first and second storage boxes.

26. The interlocking arrangement of claim 24 further includes means for preventing access to said securing means when said tailgate is in said closed position.

27. The interlocking arrangement of claim 1 wherein said locking means further includes means for selectively securing said third storage box at a predetermined position between and along said first and second storage boxes.

28. The interlocking arrangement of claim 27 wherein said securing means selectively secures said third storage box to at least one of said first and second storage boxes.

29. The interlocking arrangement of claim 27 further includes means for preventing access to said securing means when said tailgate is in said closed position.

30. The interlocking arrangement of claim 1 wherein the third storage box has a hollow interior and the top of said third storage box includes an openable lid to provide access to the interior of said third storage box while said third storage box is in said interior position.

31. The interlocking arrangement of claim 30 further including means for selectively locking said lid to prevent access to the interior of said third storage box.

32. The interlocking arrangement of claim 1 each of said first and second storage boxes has a top exposed from above and accessible from above to said passenger.

33. The interlocking arrangement of claim 32 wherein each of said first and second storage boxes has a hollow interior and each top of said first and second storage boxes includes an openable lid to provide access to said interior.

34. The interlocking arrangement of claim 33 wherein each of said first and second storage boxes further includes means for selectively locking said lid to prevent access to the interior.

35. An interlocking arrangement for storage boxes, said interlocking arrangement including a passenger vehicle having a rear tailgate mounted for movement between open and closed positions and further having a rear section with first and second side walls spaced from each other with a floor extending substantially therebetween to define a central storage area forward of said tailgate when said tailgate is in said closed position, said storage area being upwardly open from said floor to expose said floor from above and to provide a passenger of said vehicle with access from above to said storage area and to said exposed floor, said interlocking arrangement for said storage boxes further including at least first, second, and third distinct storage boxes, said third storage box being manually movable between a remote position removed from the vehicle and an interior position in said upwardly open storage area above the floor inside the rear section of the vehicle, said interlocking arrangement further including locking means for selectively locking said third storage box in said interior position in said storage area above the floor, said locking means including means for securing said first storage box to the first side wall of said vehicle and means for securing said second storage box to the second side wall of the vehicle in a position spaced from the first storage box across said floor, said locking means further including means on said first and second storage boxes for respectively engaging said third storage box positioned therebetween to prevent movement of said third storage box from said interior position upwardly between said first and second storage boxes, said locking means further including means for preventing said third storage box from being moved forwardly beyond said engagement with said first and second storage boxes and means for preventing said third storage box from being moved rearwardly beyond said engagement with said first and second storage boxes.

36. The interlocking arrangement of claim 35 wherein the third storage box has a hollow interior and the top of said third storage box includes an openable lid to provide access to the interior of said third storage box while said third storage box is in said interior position.

37. The interlocking arrangement of claim 36 further including means for selectively locking said lid to prevent access to the interior of said third storage box.

38. The interlocking arrangement of claim 35 each of said first and second storage boxes has a top exposed from above and accessible from above to said passenger.

39. The interlocking arrangement of claim 38 wherein each of said first and second storage boxes has a hollow interior and each top of said first and second storage boxes includes an openable lid to provide access to said interior.

40. The interlocking arrangement of claim 39 wherein each of said first and second storage boxes further includes means for selectively locking said lid to prevent access to the interior.

41. The interlocking arrangement of claim 35 wherein said removable third storage box has a hollow interior and includes an openable lid and means for selectively locking said lid to prevent access to said interior.

42. The interlocking arrangement of claim 41 wherein said lid locking means for said third storage box faces and substantially abuts said tailgate when said tailgate is in said closed position to thereby prevent access to said lid locking means when said tailgate is in said closed position.

43. The interlocking arrangement of claim 35 further including a rear passenger seat positionable between said first and second storage boxes.

44. The interlocking arrangement of claim 43 wherein said passenger seat is positioned forwardly of said third storage box.

* * * * *